(12) United States Patent
Ausnit

(10) Patent No.: US 6,860,844 B1
(45) Date of Patent: Mar. 1, 2005

(54) METHOD OF MANUFACTURING CARRIER WEB ZIPPER FOR GUSSET BAGS

(75) Inventor: Steven Ausnit, New York, NY (US)

(73) Assignee: Illinois Tool Works Inc., Glenview, IL (US)

( * ) Notice: Subject to any disclaimer, the term of this patent is extended or adjusted under 35 U.S.C. 154(b) by 81 days.

(21) Appl. No.: 09/678,890

(22) Filed: Oct. 4, 2000

(51) Int. Cl.[7] .................................................. B31B 1/90
(52) U.S. Cl. ....................................... 493/212; 493/213
(58) Field of Search ............................... 493/212–214, 493/927

(56) References Cited

U.S. PATENT DOCUMENTS

| | | | | |
|---|---|---|---|---|
| 4,850,178 | A | * | 7/1989 | Ausnit |
| 5,024,537 | A | * | 6/1991 | Tilman ........................ 383/63 |
| 5,823,933 | A | * | 10/1998 | Yeager |
| 5,893,645 | A | * | 4/1999 | May |
| 5,951,453 | A | * | 9/1999 | Yeager |
| 6,068,585 | A | * | 5/2000 | Ouchi |
| 6,088,998 | A | * | 7/2000 | Malin et al. |
| 6,131,374 | A | * | 10/2000 | Bois |
| 6,212,857 | B1 | * | 4/2001 | Van Erden ..................... 53/412 |
| 6,327,837 | B1 | * | 12/2001 | Van Erden ..................... 53/412 |
| 6,422,987 | B1 | * | 7/2002 | Hamm |
| 6,428,642 | B1 | * | 8/2002 | Matthews et al. |
| 6,477,820 | B1 | * | 11/2002 | Dutra et al. ................... 53/412 |

FOREIGN PATENT DOCUMENTS

| | | |
|---|---|---|
| EP | 080 5018 | 4/1997 |
| EP | 0 908 294 | 10/1998 |
| EP | 1 184 294 | 8/2001 |
| GB | 910 425 | 7/1960 |

OTHER PUBLICATIONS

Communication of Search Report and listed cited references.

* cited by examiner

Primary Examiner—Eugene Kim
(74) Attorney, Agent, or Firm—Pitney Hardin LLP

(57) ABSTRACT

A method of forming carrier web having discrete lengths of mating zipper profile thereon. The zipper profile is fed from a supply roll to overlie a carrier web, tacked to the web and then severed from its supply roll.

3 Claims, 2 Drawing Sheets

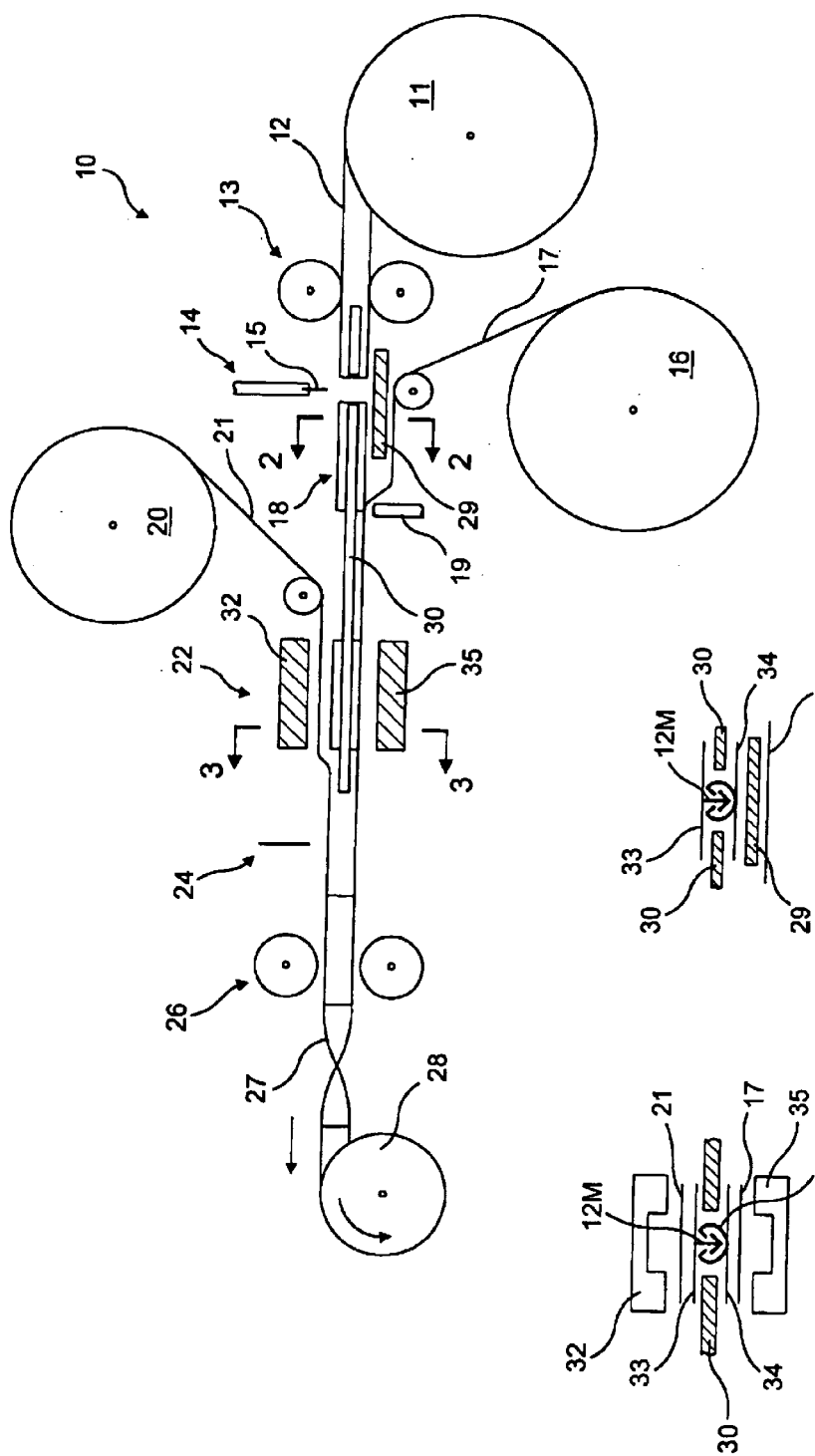

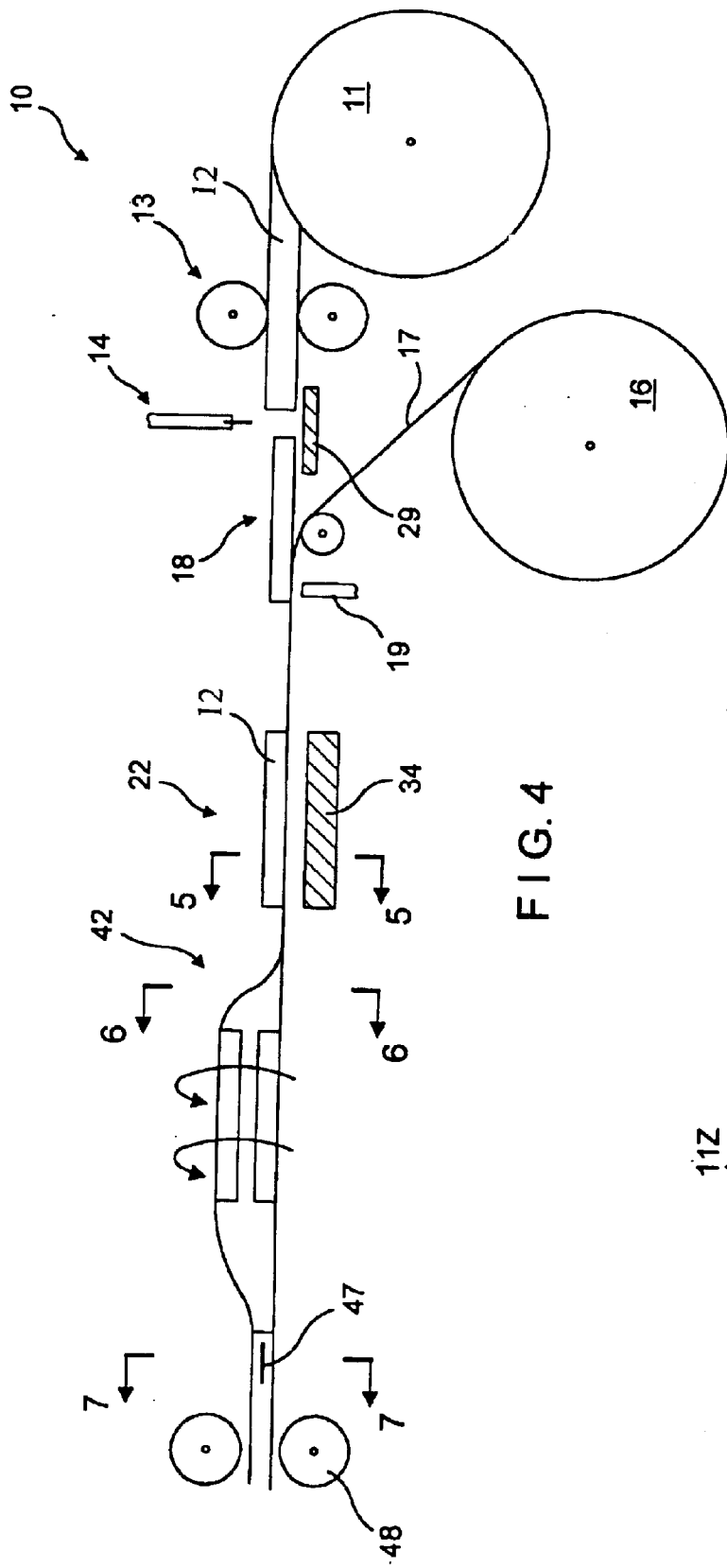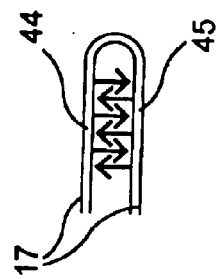

METHOD OF MANUFACTURING CARRIER WEB ZIPPER FOR GUSSET BAGS

BACKGROUND OF THE INVENTION

This invention is relates to methods of manufacturing carrier webs bearing zipper profile for use in making reclosable zipper bags with gusseted sides.

Heretofore reclosable plastic bags with gusseted sides have been made from plastic sheet having essentially uniform thickness for the front, rear and side walls including the gusset areas. While such side gusset bags featuring zippers have been produced, they have never provided a bag that could be opened to the full width of the gusset and also be fully closed by the zipper. In copending application Ser. No. 09/645,825, filed Aug. 25, 2000, entitled GUSSETED ZIPPER BAG, now U.S. Pat. No. 6,325,543, a reclosable bag with gusseted sides which overcomes the above mentioned problem is disclosed. This bag makes use of a carrier web bearing discrete sections of zipper profile.

SUMMARY OF THE INVENTION

The present invention concerns a new method of manufacturing carrier web bearing discrete sections of zipper profile for use in the manufacture of such gusseted zipper bags. One object is to produce for gusseted zipper bags a carrier web bearing intermittent zipper segments where the gusseted area to be captured by the mated zipper elements is thinner than the original bag film. A further object is to attach these mating zipper profile elements to the carrier web while maintaining the flanges of the mating elements separate and unsealed from each other.

The new method provides for discrete zipper sections to be attached to a carrier web at predetermined intervals lengthwise along the carrier web, which zipper sections may be mating profile elements or may comprise a unisexual element that is folded such that one part releasably engages the other part.

The disclosure further includes a method of folding these elements along the longitudinal axis of the carrier strip to provided mated zipper profiles.

BRIEF DESCRIPTION OF THE DRAWINGS

FIG. 1 is a side elevation schematic view partially in section of an apparatus for forming a carrier web bearing intermittent segments of zipper profile;

FIG. 2 is a sectional view taken along reference lines 2—2 of FIG. 1;

FIG. 3 is a sectional view taken along reference lines 3—3 of FIG. 1;

FIG. 4 is an elevation view partially in section of a second embodiment of the apparatus for manufacturing a second embodiment of the carrier web carrying intermittent zipper profiles;

FIG. 5 is a sectional view taken along reference lines 5—5 of FIG. 4;

FIG. 6 is a sectional view taken along reference lines 6—6 of FIG. 4; and

FIG. 7 is a sectional view taken along reference lines 7—7 of FIG. 4.

DETAILED DESCRIPTION OF THE PREFERRED EMBODIMENTS

In FIG. 1 the apparatus 10 has, at the right side of the drawing, drum 11 on which is wound a continuous strand of mated zipper profile 12. Moving to the left and downstream from this drum or source 11 of zipper profile are the following components: zipper drive 13, cutting station 14, bar seal station 22, further seal station 24, carrier web drive 26 and take-up spool 28.

Beginning at the drum 11, the zipper drive delivers zipper 12 to cutting station 14 for cutting a segment or length of zipper profile. Adjacent drum 11 and below the cutting station is drum 16 on which is wound a supply of lower carrier web 17 in the form of a continuous plastic strip.

This lower carrier web 17 is fed to underlie the segment of zipper profile, and at station 18 the cut off segment of profile is tack sealed by sealer 19 to the carrier web. Next is drum 20 from which unwinds upper carrier web 21 which is fed to bar seal station 22 where the mating portions of the zipper are joined to the upper and lower carrier webs respectively. Next 1 downstream is further seal station 24 (to be described later), and finally carrier web drive 26 pulls the zipper/carrier web combination 27 and directs it onto take-up spool 28 for future use in the manufacture of gusseted bags.

FIG. 2 is a sectional view taken through along lines 2—2 of FIG. 1 slightly downstream of cutting station 14, showing how the mating profiles are guided and how the flanges of the mating profile elements are separated. The zipper 12 consists of male and female parts 12M and 12F respectively which are joined in the usual manner by interlocking the profile elements. Male zipper 12M with its flange 33 and female zipper 12F with its flange 34 are separated by guide plate 30 above which and below which the male and female flanges 33, 34 ride. A lower plate 29 which serves as an anvil cooperating with knife 15 is provided below guide plate 30 and above the feed-off of lower carrier web 17.

Zipper drive 13 delivers zipper profile to the area 18 where tack seal 19 tacks the profile to lower carrier web 17, and knife 15 cooperating with anvil 29 severs the trailing end of a segment of zipper profile from the front end of the following segment. The lower carrier web then moves the zipper profile segment further downstream to station 22 where upper carrier web 21 delivered from drum 20, is positioned to overlie said zipper segment along with the lower carrier web below it, all of which is now situated between seal bars 32 and 35 at station 22.

The bar seal station 22 is further illustrated in FIG. 3 wherein upper carrier web 21 is below upper seal 32 and above the flange 33 of the male profile element 12M. The flanges 33 and 34 of the upper and lower zipper elements being separated by guide plate 30.

As evident, when the seal bars 32, 35 converge, upper carrier web 21 becomes sealed to male zipper flange 33 and lower carrier web 17 becomes sealed to flange 34 of female zipper, while the two flanges 33, 34 remain separated from each other because of the guide plate at between them, which prevents them from being sealed together. In addition seal bars 32 and 34 are notched in the areas of the male and female profiles so as to prevent any accidental sealing of the profiles to each other. Downstream from seal station 22 is carrier web drive 26 which pulls the resulting carrier web 27 comprising continuous webs 17 and 21 with the intermittently spaced zipper elements, where the male and female profile elements are releasably interlocked together, and the male and female elements respectively are permanently joined respectively to the upper and lower carrier webs 21, 17.

For the sake of clarity and simplicity, FIG. 4 and other figures herein, having certain components substantially the same as components in FIG. 1, will use the same reference numbers for such components. Accordingly, in FIG. 4 there is drum 11 with a continuous supply of zipper 11Z the profile of which engages with itself. Such profile is depicted schematically in FIG. 5 as an array of six spaced-apart arrows, which will be discussed in further detail later.

Downstream of drum 11 in FIG. 4 is zipper drive 13 which directs the zipper to cutting station 14 and adjacent to tack seal station 18 where the zipper is tack sealed to lower carrier web 17. Thereafter, seal bar 34 secures the lower carrier web 17 to the zipper. In this instance the heat delivered by the seal bar is closely controlled to prevent distorting the interlocking elements. At folding station 42 the zipper and its carrier web are folded about their central longitudinal axis as further schematically indicated in FIG. 6 so as to cause one half of the profile of the zipper to interlock with the other half.

Upon complete folding, as schematically seen in FIG. 7, the zipper now has upper and lower parts 44, 45 releasably interlocked with carrier web above and below the folded profile.

At the end of this folding phase a cutting element 47 slices the lower carrier web 117 and zipper flanges lengthwise so that the zipper's upper element 44 and lower element 45 are fully separated. After the cutting element 47, a sealing station 49 seal across the carrier webs at a point half way between zipper element sections. Downstream of this slicing phase is a final carrier web drive 48 which pulls the manufactured zipper product and feeds it to a spool for later combination with bag material.

Having thus described the invention, what is claimed is:

1. A method of forming a zipper bearing carrier web comprising the steps of:

providing a zipper profile including a first interlocking profile element with a first flange extending in a first direction from said first interlocking profile and a second flange extending in a second direction from said first interlocking profile and a second interlocking profile element with a first flange extending in a first direction from said second interlocking profile and a second flange extending in a second direction from said second interlocking profile, said first and second interlocking profile elements being interlocked to each other;

advancing a first continuous strip of carrier web in a machine direction; and attaching discrete sections of said first flange and said second flange of at least one of said first and second interlocking profile elements oriented in the machine direction at predetermined spaced intervals to said first continuous strip of carrier web to form a supply of carrier web with pre-positioned sections of zipper profile.

2. A method in accordance with claim 1 comprising the further steps of advancing a second continuous strip of carrier web and positioning said discrete sections of said first flange and said second flange of said at least one of said first and second interlocking profile elements between said carrier webs.

3. The method in accordance with claim 2 comprising the further steps of simultaneously attaching each discrete section of said first and second flanges of said first interlocking profile element to said first continuous strip of carrier web and said first and second flanges of said second interlocking profile element to said second continuous strip of carrier web.

* * * * *